Figure 1:
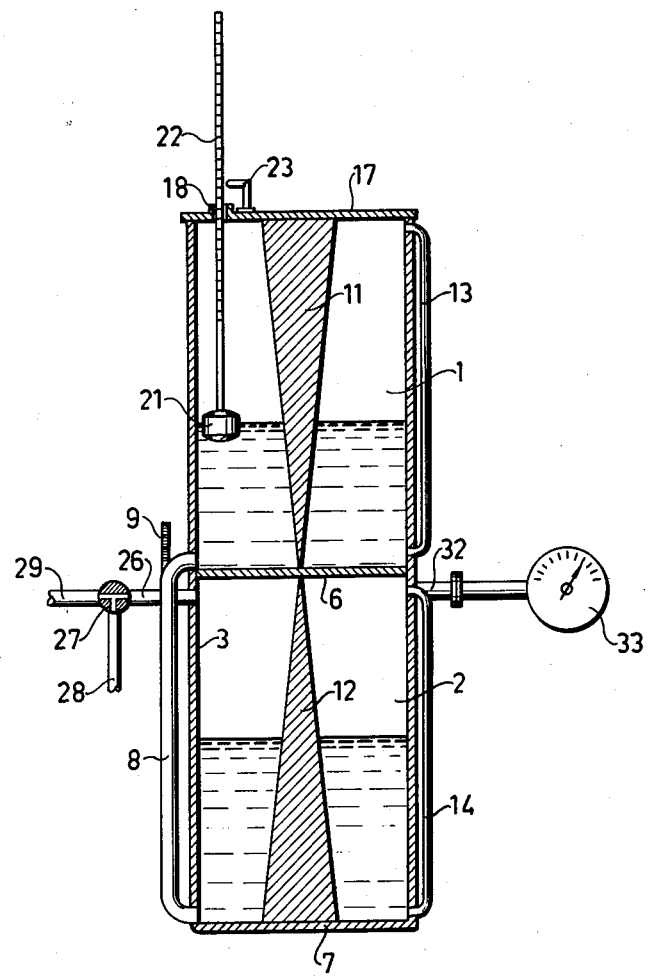

Jan. 29, 1963   CARL-GUNNAR D. ENGSTRÖM   3,075,384
APPARATUS FOR MEASURING QUANTITIES OF GASES
Filed Sept. 12, 1960   2 Sheets-Sheet 1

INVENTOR
Carl-Gunnar Daniel Engström
BY Pierce, Scheffler & Parker
ATTORNEYS

Jan. 29, 1963 CARL-GUNNAR D. ENGSTRÖM 3,075,384
APPARATUS FOR MEASURING QUANTITIES OF GASES
Filed Sept. 12, 1960 2 Sheets-Sheet 2

INVENTOR
Carl-Gunnar Daniel Engström
BY Pierce, Scheffler & Parker
ATTORNEYS

United States Patent Office 3,075,384
Patented Jan. 29, 1963

3,075,384
APPARATUS FOR MEASURING QUANTITIES OF GASES
Carl-Gunnar Daniel Engström, Alluddsvägen 3, Stockholm, Sweden
Filed Sept. 12, 1960, Ser. No. 55,369
Claims priority, application Sweden Sept. 16, 1959
10 Claims. (Cl. 73—234)

The present invention relates to an apparatus for measuring quantities of gases, which are supplied more or less continually, and more particularly the invention relates to such apparatus which comprises a gas tank, from which the gas is expelled through a gas outflow at the top of the tank by means of a liquid, which is admitted into the tank from a container arranged at a higher level than the gas tank. For supplying more gas than is contained in the tank intermittent replenishment with fresh gas is provided when a suitable amount of gas has been expelled.

An apparatus of the present kind may be used within many domains of activity, e.g. industry, medicine and laboratories of different kinds. It has special importance in supplying oxygen and/or gases for artificial respiration or narcosis, with laughing gas for example, particularly by means of respirators, e.g. of the kind described in applicant's U.S. Patent No. 2,699,163, dated Jan. 11, 1955.

It is an object of the invention to provide an apparatus of the kind set forth, which when once started works wholly automatically and may be brought continually to indicate expelled gas, e.g. expressed as volume units under normal conditions, i.e. 0° C., 760 millimeters of mercury and free from moisture (STPD) as a function of the pressure in the tank, so that by checking the pressure reduction the amount of gas expelled from the tank is ascertainable. It is desired, especially in medicine, at operations etc. for example, that the reduction of pressure be directly proportional to the amount of gas of normal conditions which is expelled, because then the pressure indicator always shows the same deflexion for the same amount of gas expelled, independently of the loading of the tank, and the recording is facilitated. Basically the tank should be stationary and arranged in such a way that gas is expelled merely due to the weight of the liquid flowing down, atmospheric pressure on the surface of the liquid in the tank being as a rule presumed.

The apparatus of the invention is mainly characterized by the fact that the horizontal cross-section area or volume per unit height of the gas tank gradually increases from the base of the tank towards the top thereof and/or that the horizontal cross-section area or volume per unit height of the fluid tank gradually increases from the top of the liquid tank towards the base thereof, the ratio of said increase to the lowering of the fluid level, substantially being such that the reduction of pressure in the gas tank caused by such lowering is directly proportional to the gas amount expelled at the same time, expressed as volume of gas of normal conditions (STPD). The tanks are preferably shaped so that the increase of the volume of the gas tank upwardly is substantially equal to the increase of the volume of the liquid tank downwardly, the effective parts of the tanks being of the same volume. Simple conditions regarding construction and calculation of the apparatus are obtained, if at least one of the tanks is a truncated cone or a pyramid or at least one of the tanks contains a body having the shape of a cone or pyramid, which may be truncated. In general the rule is as follows. For given values of the upper and lower extreme positions for the levels of the liquid surfaces in both of the tanks (vessels) and of the volume enclosed between said extreme positions (which is equal for both of the vessels), the horizontal cross-section area of the lower vessel must at each liquid level be less than an area which decreases hyperbolically with rising liquid level (inversely to the square of said level) and the magnitude of which is otherwise wholly determined by said values and the atmospheric pressure outside the vessels.

The invention will now be described more in detail with reference to embodiments illustrated in the accompanying drawings it being understood, however, that the invention is not restricted thereto.

In the drawings:

FIG. 1 is a cross-sectional view of a device according to the invention in which the tanks are provided with conical insertions, and FIGS. 2–5 illustrate diagrammatically modifications of the tanks as will be described more in detail hereinbelow.

Referring to FIG. 1, the liquid tank 1 is in this embodiment united with the gas tank 2 within a common cylindrical casing 3 and the tanks are separated from each other by the partition 6 and the gas tank is provided with a bottom 7. The bases of the two tanks are connected with each other by a pipe 8, which is in this embodiment provided with a thermometer 9 for measuring the temperature of the over-flowing liquid. Each of the tanks is provided with a conical body 11 and 12 respectively, which in the embodiment illustrated are centrally arranged, although this is not necessary. If the apparatus is made of opaque material it is as shown in the figure advisable to provide gauge glasses 13 and 14, which may be graduated to indicate pressure or gas amount. Since the cross sectional area of the gas tank 2 increases upwardly and that of the liquid tank 1 increases downwardly, the cone 12 in the gas tank is pointed upwardly whereas the cone 11 in the liquid tank is pointed downwardly, the base of cone 11 being attached to a cover 17. Through an opening 18 in the cover 17 the interior of the tank 1 communicates with the ambient pressure and a graduated rod 22 which is attached to a float 21 may extend through the same opening 18 or another opening. The pressure or the amount of gas expelled may be ascertained by observing the mark on the rod at the pointer 23. At the top of the gas tank 2 there is connected a pipe 26 and by means of a three-way valve 27 this pipe may be connected with a gas inlet pipe 28 for refilling the gas tank or with the vent pipe 29, which may lead to a respirator for artificial respiration or narcosis, preferably via a self-regulating dosage device. To pipe 32 there may be connected a pressure gauge 33, which e.g. is provided with a pressure sensitive membrane with a known electric extension gauge. This gauge as well as the rod 22 may be connected with a recorder. Gauge 33 and the gauge consisting of the float 21, rod 22 and pointer 23 may be used alternatively or together e.g. the pipe 32 may be long and flexible permitting the gauge 33 to be positioned at one location for observation by one person while the gauge 21, 22, 23 may serve for observation by another person.

As an example of the size of an apparatus as set forth above adapted for use in medicine it may be mentioned that the diameter of the tanks may be 182 mm. and the height of each of the tanks may be 288 mm., thus the total height being about 577 mm. The base radius of the cones may be 36 mm. Each of the tanks, the gauge glass included, contains 7525 milliliters and the volume of the inserted body is 393 milliliters, the effective volume thus being 7132 milliliters. In this apparatus a pressure difference of 1 centimeter of water corresponds to a gas volume of 130 ml., determined at the prevailing pressure. This value is as usual converted to normal conditions (STPD).

Generally the liquid used is water saturated with the gases subject to metering, a mixture of oxygen and laughing gas for example of predetermined composition for laughing gas narcosis. It is, however, obvious that any suitable liquid may be used.

Figure 2:
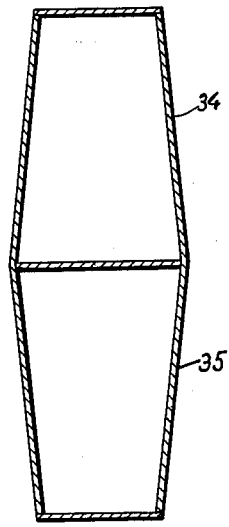
Figure 3:
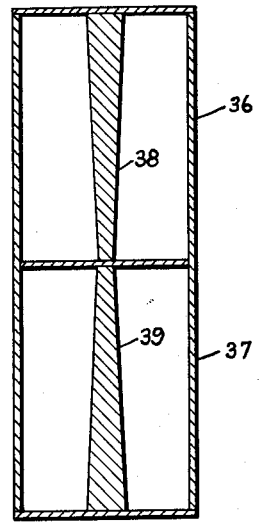
Figure 4:
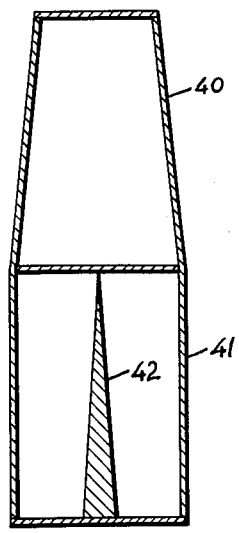
Figure 5:
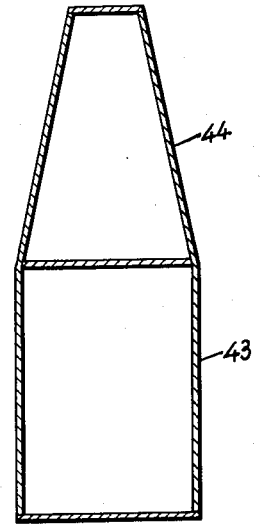

On using the apparatus, the gas tank 2 at first is filled with water, which may contain substantial amounts of substances dissolved therein, or any other suitable liquid which in advance may have been saturated with the gas or gas mixture subject to metering. The liquid tank 1 is substantially empty. Then the gas mixture is introduced through pipe 28, valve 27 and pipe 26 into the tank 2 to a required level, the liquid being forced from the tank 2 into the liquid tank 1. Then the three-way valve 27 is adjusted so that the gas may depart through pipe 26, valve 27 and pipe 29 to the place where it is to be used. As the gas is being consumed at that place the liquid level in tank 2 rises and that in tank 1 in the same degree sinks. In the gas tank 2 the gas is subjected to a super-pressure above that resting upon the liquid surface in the liquid tank 1 which corresponds to the difference of liquid level in the tanks. This pressure reduces as gas is expelled and the liquid level in tank 2 rises, but provided that the size of the cones is correct a rise of 1 centimeter of said level always corresponds to the expelling of an equal amount of gas, because the volume of each 1 centimeter segment is increased in the same proportion as the pressure is reduced. This is a general rule and is not restricted to tanks containing conical bodies inserted therein. Thus the tanks 34 and 35 may be shaped as truncated cones as illustrated in FIG. 2 where the one tank is the mirror image of the other and the filler bodies are omitted. The embodiment illustrated in FIG. 3 comprises cylindrical tanks 36 and 37 provided with insertions 38 and 39 of truncated conical or pyramidical shape, also these tanks being similar. It is not necessary, however, that the tanks are equal but placed invertedly. Thus FIG. 4 shows an embodiment in which the upper tank 40 has the shape of a truncated cone, whereas the lower tank 41 is cylindrical and has a conical or pyramidical insertion 42. It is even possible, as shown in FIG. 5, that one of the tanks 43 is cylindrical and the other 44 has the shape of a truncated cone or pyramid, in which case, however, the tapering of the cone or pyramid is greater than in the embodiment illustrated in, for instance, FIG. 2.

It is obvious that the change of volume may be obtained with bodies other than cones. The bodies may have other shapes, for instance such as a bundle of rods of different length. The change of volume then occurs stepwise but almost continually if the number of rods is large. Further the tanks themselves may be conical, the inserted bodies being left out or made smaller. The shape is not necessarily conical but may be pyramidal as well. It is obvious that the walls of the tanks also may be inward-curving. If the two tanks are not symmetrical to each other or not mirror images of each other but e.g. only one of them is provided with a body inserted therein etc. the body in question must be shaped in a more complicated way than a cone. The correct shape of the inserted body giving a constant gas amount for a certain pressure reduction may easily be calculated mathematically. It is most convenient to calculate the generatrix of a rotation body.

What is claimed is:

1. An apparatus for measuring gas quantities comprising a gas tank having an upper limiting wall and a gas outlet near the top of the tank, and a liquid tank at a level higher than that of said gas tank, said liquid tank having a lower limiting wall and communicating at its top with a source of constant gas pressure, each of said tanks comprising a liquid exchanging portion extending from the bottom thereof upwards and adapted to hold a liquid during at least one stage of the measuring operation, a conduit connecting the lower parts of said gas and liquid tanks and permitting liquid to pass by gravity from said liquid exchanging portion of the liquid tank to said liquid exchanging portion of the gas tank thereby displacing gas from the gas tank through said gas outlet, the horizontal cross-section area of said liquid exchanging portion of at least one of said tanks increasing successively in the tank towards its said limiting wall, said increase being substantially such that at any level within said liquid exchanging portion of the tank independently of the degree of filling of the gas tank with gas, a unit reduction of the difference between the liquid level in the gas tank and the liquid level in the liquid tank, i.e. a unit reduction of the gas pressure in the gas tank, always corresponds to the same amount by weight of gas displaced from the gas tank and means for ascertaining the gas pressure in said gas tank.

2. An apparatus as claimed in claim 1, in which at least in the liquid exchanging portions of the tanks the rate of increase of the cross-section area of the gas tank is substantially equal to the rate of increase of the cross-section area of the liquid tank in the directions towards said limiting walls.

3. An apparatus as claimed in claim 1 in which in at least one of the tanks said liquid exchanging portion has the shape of a truncated pyramid.

4. An apparatus as claimed in claim 1 in which at least one of the tanks in its liquid exchanging portion has an insert body of the shape of at least the lower portion of a pyramid.

5. An apparatus as claimed in claim 2 in which in at least one of the tanks said liquid exchanging portion has the shape of a truncated pyramid.

6. An apparatus as claimed in claim 2 in which at least one of the tanks in its liquid exchanging portion has an insert body of the shape of at least the lower portion of a pyramid.

7. An apparatus as claimed in claim 1 in which in at least one of the tanks said liquid exchanging portion has the shape of a truncated cone.

8. An apparatus as claimed in claim 2 in which in at least one of the tanks said liquid exchanging portion has the shape of a truncated cone.

9. An apparatus as claimed in claim 1 in which at least one of the tanks in its liquid exchanging portion has an insert body of the shape of at least the lower portion of a cone.

10. An apparatus as claimed in claim 2 in which at least one of the tanks in its liquid exchanging portion has an insert body of the shape of at least the lower portion of a cone.

References Cited in the file of this patent
UNITED STATES PATENTS

| | | |
|---|---|---|
| 126,010 | Bennett | Apr. 23, 1872 |
| 1,012,696 | Neudecker | Dec. 26, 1911 |